United States Patent [19]

McCready et al.

[11] Patent Number: 4,760,112

[45] Date of Patent: Jul. 26, 1988

[54] THERMOPLASTIC POLYETHERIMIDE ESTER POLYMERS EXHIBITING HIGH FLEXURAL MODULUS

[75] Inventors: Russell J. McCready; John A. Tyrell, both of Mt. Vernon, Ind.

[73] Assignee: General Electric Company, Pittsfield, Mass.

[21] Appl. No.: 936,530

[22] Filed: Dec. 1, 1986

[51] Int. Cl.$^4$ .................. C08G 63/76; C08G 69/44
[52] U.S. Cl. .................................. 525/33; 528/292; 528/296
[58] Field of Search ............... 528/292, 296; 525/33

[56] References Cited

U.S. PATENT DOCUMENTS

| | | | |
|---|---|---|---|
| 4,371,693 | 2/1983 | Wolfe | 528/292 |
| 4,556,688 | 12/1985 | McCready et al. | 525/33 |
| 4,556,705 | 12/1985 | McCready | 528/289 |
| 4,661,582 | 4/1987 | McCready | 528/292 |
| 4,673,726 | 6/1987 | Jackson et al. | 528/288 |

*Primary Examiner*—Lucille M. Phynes
*Attorney, Agent, or Firm*—William F. Mufatti; Spencer D. Conard

[57] ABSTRACT

Polyetherimide ester polymers exhibiting a high flexural modulus comprising the reaction products of:
 (i) at least one diol;
 (ii) at least one dicarboxylic acid or an ester forming reactive derivative thereof; and
 (iii) a set of reactants selected from
  (a) (1) at least one high molecular weight poly(oxy alkylene)diamine, and (2) at least one tricarboxylic acid or its derivative, or
  (b) at least one high molecular weight polyoxyalkylene diimide diacid;
wherein the weight ratio of (iii) to (ii) is from about 0.002 to 0.20:1.

32 Claims, No Drawings

THERMOPLASTIC POLYETHERIMIDE ESTER POLYMERS EXHIBITING HIGH FLEXURAL MODULUS

BACKGROUND OF THE INVENTION

Polyetherimide ester polymers comprised of the reaction products of (a) a low molecular weight diol, (b) a dicarboxylic acid, and (c) a high molecular weight polyoxyalkylene diimide diacid are known and are described in U.S. Pat. Nos. 4,544,734; 4,556,705 and 4,556,688. These poly(etherimide ester) elastomers exhibit excellent stress-strain properties, low tensile set, high melting temperatures and/or excellent strength/toughness characteristics as well as high flexibility, which render them especially suitable for molding and extrusion applications. In the preparation of these elastomers the amounts of polyoxyalkylene diimide diacid and dicarboxylic acid reactants employed are such that the weight ratio of the polyoxyalkylene diimide diacid to dicarboxylic acid is from about 0.25 to about 2.0:1.

It has now been discovered that polyetherimide ester polymers can be provided which exhibit higher flexural modulus and, therefore, better stiffness than these conventional polyetherimide esters. The polymers of the instant invention are obtained by utilizing relatively low weight ratios of the diimide diacid to the dicarboxylic acid reactants.

SUMMARY OF THE INVENTION

In accordance with the instant invention there are provided poly(etherimide ester) polymers exhibiting higher or improved flexural modulus than possessed by the presently available conventional poly(ethermide ester) polymers. The polymers of the present invention are comprised of the reaction products of:
(i) at least one diol;
(ii) at least one dicarboxylic acid or an ester forming reactive derivative thereof; and
(iii) low amounts of a set of reactants selected form
  (a) (1) at least one high molecular weight poly(oxy alkylene)diamine, and (2) at least one tricarboxylic acid containing two vicinal carboxyl groups or a derivative of said acid, or
  (b) at least one high molecular weight polyoxyalkylene diimide diacid.

DESCRIPTION OF THE INVENTION

In accordance with the instant invention there are provided poly(etherimide ester)polymers which exhibit improved or higher flexural modulus as compared with presently available conventional poly (etherimide ester) polymers. The poly(etherimide ester) polymers of the present invention also exhibit better solvent resistance than these conventional poly(etherimide ester) polymers.

The polymers of the present invention are comprised of the reaction products of:
(i) at least one diol;
(ii) at least one dicarboxylic acid or its ester forming derivative; and
(iii) one set of reactants selected from
  (a) (1) at least one high molecular weight poly(oxy alkylene)diamine, and (2) at least one tricarboxylic acid or its derivative, or
  (b) at least one high molecular weight polyoxyalkylene diimide diacid;

wherein the weight ratio of (iii) to (ii) is from about 0.002 to 0.20:1, preferably from about 0.005 to about 0.15:1, and more preferably from about 0.005 to about 0.10:1.

Suitable diols (i) for use in preparing the polymers of the present invention include the saturated and unsaturated aliphatic and cycloaliphatic dihydroxy compounds as well as aromatic dihydroxy compounds. These diols are preferably of a low molecular weight, i.e., having a molecular weight of about 250 or less. When used herein, the term "diol" and "low molecular weight diol" should be construed to include equivalent ester forming derivatives thereof, provided, however, that the molecular weight requirement pertains to the diol only and not to its derivative. Exemplary of ester forming derivatives there may be given the acetates of the diols as well as, for example, ethylene oxide or ethylene carbonate for ethylene glycol.

Preferred saturated and unsaturated aliphatic and cycloaliphatic diols are those having from 2 to about 15 carbon atoms. Exemplary of these diols there may be given ethylene glycol, propanediol, butanediol, pentanediol, 2-methyl propanediol, 2,2-dimethyl propanediol, hexanediol, decanediol, 1,2-, 1,3- and 1,4- cyclohexane dimethanol, butenediol, hexenediol, etc. Especially preferred are 1,4-butanediol and mixtures thereof with hexanediol, 1,4-cyclohexane dimethanol, or butenediol, most preferably 1,4-butanediol.

Aromatic diols suitable for use in the practice of the present invention are generally those having from 6 to about 15 carbon atoms. Included among the aromatic dihydroxy compounds are resorcinol, hydroquinone, 1,5-dihydroxy naphthalene, 4,4'-di-hydroxy naphthalene, 4,4'-dihydroxy diphenyl, bis-(p-hydroxy phenyl)methane and bis(p-hydroxy phenyl)-2,2-propane.

Especially preferred diols are the saturated aliphatic diols, mixtures thereof, and mixtures of a saturated diol(s) with an unsaturated diol(s), wherein each diol contains from 2 to about 8 carbon atoms. Where more than one diol is employed, it is generally preferred that at least about 60 mole %, based on the total diol content, be the same diol, more preferably at least 80 mole %. As mentioned above, the preferred compositions are those in which 1,4-butanediol is present in a predominant amount, most preferably when 1,4-butanediol is the only diol.

Dicarboxylic acids (ii) which are suitable for use in the practice of the present invention are aliphatic, cycloaliphatic, and/or aromatic dicarboxylic acids. These acids are preferably of a low molecular weight, i.e., having a molecular weight of less than about 300. However, in some cases higher molecular weight dicarboxylic acids may be used. The term "dicarboxylic acids" as used herein, includes equivalents of dicarboxylic acids having two functional carboxyl groups which perform substantially like dicarboxylic acids in reaction with glycols and diols in forming polyesters. These equivalents include esters and ester forming reactive derivatives, such as acid halides and anhydrides. The molecular weight preference mentioned above pertains to the acid and not to its equivalent ester or ester-forming derivatives. Thus, an ester of a dicarboxylic acid having a molecular weight greater than about 300 or an acid equivalent of a dicarboxylic acid having a molecular weight greater than about 300 are included provided the acid has a molecular weight below about 300. Additionally, the dicarboxylic acids may contain any substituent groups(s) or combinations which do not substantially interfere with the polymer formation and use of the polymer of this invention.

Aliphatic dicarboxylic acids, as the term is used herein, refer to carboxylic acids having two carboxyl groups each of which is attached to a saturated carbon atom. If the carbon atom to which the carboxyl group is attached is saturated and is in a ring, the acid is cycloaliphatic.

Aromatic dicarboxylic acids, as the term is used herein: are dicarboxylic acids having two carboxyl groups each of which is attached to a carbon atom in an isolated or fused benzene ring system. It is not necessary that both functional carboxyl groups be attached to the same aromatic ring and where more than one ring is present, they can be joined by aliphatic or aromatic divalent radicals such as —O— or —SO$_2$—.

Representative aliphatic and cycloaliphatic acids which can be used for this invention are sebacic acid, 1,2-cyclohexane dicarboxylic acid, 1,3-cyclohexane dicarboxylic acid, adipic acid, glutaric acid, succinic acid, oxalic acid, dimer acid, 4-cyclohexene-1, 2-dicarboxylic acid, 2-ethysuberic acid, tetramethylsuccinic acid, cyclopentanedicarboxylic acid, decahydro-1,5 naphthlene dicarboxylic acid, 4,4'-bicyclohexyl dicarboxylic acid, decahydro-2,6 naphthalene dicarboxylic acid, 4,4 methylenebis(cyclohexane carboxylic acid), 3,4-furan dicarboxylic acid, and 1,1-cyclobutane dicarboxylic acid. Preferred aliphatic acids are cyclohexane dicarboxylic acids, sebacic acid, glutaric acid and adipic acid.

Representative aromatic dicarboxylic acids which can be used include terephthalic, phthalic and isophthalic acids, bi-benzoic acid, substituted dicarboxy compounds with two benzene nuclei such as bis(p-carboxyphenyl)methane, oxybis(benzoic acid), ethylene-1,2-bis(p-oxybenzoic acid), 1,5-naphthalene dicarboxylic acid, 2,6-naphtalene di-carboxylic acid, 2,7-naphthalene dicarboxylic acid, phenantherene dicarboxylic acid, anthracene dicarboxylic acid, 4,4'-sulfonyl dibenzoic acid, and halo and $C_1$-$C_{12}$ alkyl, alkoxy, and aryl ring substitution derivatives thereof. Hydroxy acids such as p(beta-hydroxyethoxy)benzoic acid can also be used provided an aromatic dicarboxylic acid is also present.

Preferred dicarboxylic acids for the preparation of the polyetherimide esters of the present invention are the aromatic dicarboxylic acids, mixtures thereof and mixtures of one or more dicarboxylic acids with an aliphatic and/or cycloaliphatic dicarboxylic acid, most preferably the aromatic dicarboxylic acids. Among the aromatic acids those with 8-16 carbon atoms are preferred, particularly the benzene dicarboxylic acids, i.e., phthalic, terephthalic and isophthalic acids and their dimethyl derivatives. Especially preferred is dimethyl terephthalate.

Finally, where mixtures of dicarboxylic acids are employed in the practice of the present invention, it is preferred that at least about 60 mole %, preferably at least about 80 mole %, based on 100 mole % of dicarboxylic acid (ii) be the same dicarboxylic acid or ester derivative thereof. As mentioned above, the preferred compositions are those in which dimethylterephthalate is the predominant dicarboxylic acid, most preferably when dimethylterephthalate is the only dicarboxylic acid.

The polyetherimide ester polymers of the present invention may be prepared by a one-pot synthesis involving the reaction of the diol (i), the dicarboxylic acid (ii), the high molecular weight poly(oxy alkylene)diamine (iii)(a)(1), and the tricarboxylic acid or its derivative (iii)(a)(2). In such a synthesis the polyoxyalkylene diimide diacid (iii)(b) is formed in-situ by the reaction of the poly(oxy alkylene)diamine with the tricarboxylic acid.

The poly(oxy alkylene)diamines (iii)(a)(1) suitable for use in the present invention may be represented by the following general formula

   I wherein G is the radical remaining after the removal of the amino groups of a long chain alkylene ether diamine. These polyether diprimary diamines are available commercially from Texaco Chemical Company under the trademark JEFFAMINE. In general they are prepared by known processes for the amination of glycols. For example, they may be prepared by aminating the glycol in the presence of ammonia, Raney nickel catalyst and hydrogen as set forth in Belgium Pat. No. 634,741. Alternately, they may be prepared by treating glycol with ammonia and hydrogen over a Nickel-Copper-Chromium catalyst as taught by U.S. Pat. No. 3,654,370. Other methods for the production thereof include those taught by U.S. Pat. Nos. 3,155,728 and 3,236,895 and French Patent Nos. 1,551,605 and 1,466,708, all of the foregoing patents are incorporated herein by reference.

The long chain ether diamines suitable for use herein are the polymeric diamines having terminal (or as nearly terminal as possible) amine groups and an average molecular weight of from about 600 to about 12,000, preferably from about 900 to about 4,000. Additionally, the long chain ether diamines will generally have a carbon-to-oxygen ratio of from about 1.8 to about 4.3.

Representative long chain ether diamines are the poly(alkylene ether)diamines including poly(ethylene ether)diamine, poly(propylene ether)diamine, poly(tetramethylene ether)diamine; random or block copolymers of ethylene oxide and propylene oxide including propylene oxide and poly(propylene oxide) terminated poly(ethylene ether)diamine; and aminated random or block copolymers of tetrahydrofuran with minor amounts of a second monomer such as ethylene oxide, propylene oxide, and methyl tetrahydrofuran (used in proportions such that the carbon-to-oxygen mole ratio in the diamine does not exceed about 4.3 to 1). Polyformyl diamines prepared by reacting formaldehyde with diols such as 1,4-butanediol and 1,5-pentanediol and subsequently aminating are useful. Especially preferred poly(alkylene ether) diamines are poly(propylene ether)diamine, poly (tetramethylene ether)diamine, and the poly(ethylene ether)glycols which are end-capped with poly (propylene ether) and/or propylene oxide and subsequently aminated.

In general, the polyoxyalkylene diamines useful in the practice of the present invention have an average molecular weight of from about 600 to about 12,000, preferably from about 900 to about 4,000.

The tricarboxylic acid (iii)(a)(2) may be almost any carboxylic acid anhydride containing an additional carboxylic group or the corresponding acid thereof containing two imide-forming vicinal carboxyl groups in lieu of the anhydride group. Mixtures thereof are also suitable. The additional carboxylic group must be esterifiable.

While trimellitic anhydride is preferred as the tricarboxylic acid component, any number of suitable tricarboxylic acid constituents will occur to those skilled in the art including 2,6,7-naphthalene tricarboxylic anhydride, 3,3',4-diphenyl tricarboxylic anhydride, 3,3',5-benzophenone tricarboxylic anhydride, 1,3,4-cyclopentane tricarboxylic anhydride, 2,2',3-diphenyl tricarboxylic anhydride, diphenyl sulfone3,3',4-tricarboxylic anhydride, ethylene tricarboxylic anhydride, 1,2,5-naphthalene tricarboxylic anhydride, 1,2,4-butane tricarboxylic anhydride, and 1,3,4-cyclohexane tricarboxylic anhydride. These tricarboxylic acid materials can be characterized by the following general formula

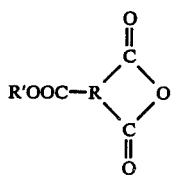

II.

wherein:
R is a trivalent organic radical, preferably a $C_2$–$C_{20}$ aliphatic or cycloaliphatic, or $C_6$–$C_{20}$ aromatic trivalent radical;
$R^1$ is preferably hydrogen or a monovalent organic radical preferably selected from $C_1$–$C_6$ aliphatic and/or cycloaliphatic radicals and $C_6$–$C_{12}$ aromatic radicals, e.g., benzyl; most preferably hydrogen.

In the preparation of the instant polyetherimide ester polymers sufficient amounts of diol versus dicarboxylic acid, and tricarboxylic acid versus diamine must be present, as recognized in the art, to allow for substantially complete polymerization.

This type of one-pot reaction involving the reactions of (i) a diol component, (ii) a dicarboxylic acid component, (iii)(a)(1) a poly(oxy alkylene)diamine component, and (iii)(a)(2) a tricarboxylic acid component is described in U.S. Pat. No. 4,556,688 to McCready et al. incorporated herein by reference. In this type of one-pot reaction the amount of diol (i) employed will be, in general, a molar excess, preferably about 1.5 molar equivalents, based on the combined molar equivalents of dicarboxylic acid (ii) and of the total moles of the tricarboxylic acid (iii)(a)(2). The amount of the tricarboxylic acid employed will preferably be about two molar equivalents based on the number of moles of the poly(oxy alkylene) diamine. Obviously, less than two molar equivalents would result in incomplete imidization of the diamine resulting in potentially poorer properties. Conversely, greater than two molar equivalents of the tricarboxylic acid may lead to cross-linking and/or branching of the polymer. Generally, mole ratios of 2 moles tricarboxylic acid to 0.85 to 1.15 moles of poly-(oxy alkylene)diamine yield useful polymers.

The amount by which the diamine (iii)(a)(1) and the dicarboxylic acid (ii) are used in the present invention is critical in providing polyetherimide ester polymers exhibiting high flexural modulus and, therefore, greater stiffness, as well as improved solvent resistance. The amounts of the poly(oxy alkylene)diamine and dicarboxylic acid or its derivatives used must be such that the weight ratio of the theoretical amount of the polyoxyalkylene diimide diacid, formable from the poly(oxy alkylene)diamine and the tricarboxylic acid, to the dicarboxylic acid is from about 0.002 to 0.20:1, preferably from about 0.005 to about 0.15:1, and more preferably from about 0.005 to about 0.10:1. If this weight ratio is exceeded, i.e., is greater than 0.20:1, the flexural modulus of the polymer will be adversely affected. That is to say, the flexural modulus will be lowered and will begin to approach that of the conventional polyetherimide esters, with a concomitant loss of stiffness. The solvent resistance of the instant polytherimide esters will also be adversely affected.

The instant polyetheimide esters may also be prepared by a two-pot synthesis involving the reaction of the diol (i), the dicarboxylic acid (ii), and the polyoxyalkylene diimide diacid (iii) (b). Such a reaction is described in U.S. Pat. No. 4,556,705 to McCready, incorporated herein by reference. Basically, in this process the poly(oxy alkylene)diamine is reacted with the tricarboxylic acid to form a polyoxyalkylene diimide diacid, and the preformed polyoxyalkylene diimide diacid is then reacted with the diol and the dicarboxylic acid to form the polyetherimide ester polymers.

The polyoxyalkylene diimide diacid (iii)(b) may be represented by the general fromula

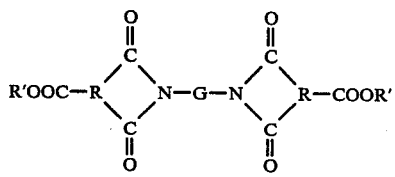

III.

wherein G, R and R' are as defined hereinafore.

The polyoxyalkylene diimide diacids of Formula III suitable for use herein are high molecular weight diimide diacids having an average molecular weight greater than about 700, preferably greater than about 900. They may be prepared by the imidization reaction of one or more tricarboxylic acids (iii)(a)(2) containing two vicinal carboxyl groups or an anhydride group and an additional carboxyl group which must be esterifiable with the high molecular weight poly (oxy alkylene)diamine (iii)(a)(1). These polyoxyalkylene diimide diacids and processes for their preparation are disclosed in U.S. Pat. No. 4,556,705, incorporated herein by reference. Briefly, these polyoxyalkylene diimide diacids may be prepared by known imidization including melt synthesis or by synthesizing in a solvent system. Such reactions will generally occur at temperatures from about 100° C. to about 300° C., preferably at temperatures from about 150° C. to about 250° C., while drawing off water or in a solvent system at the reflux temperature of the solvent or azeotropic (solvent) mixture.

In this two-pot process, as in the one-pot process described hereinafore, it is generally preferred that the diol be present in at least a molar equivalent amount, preferably a molar excess, most preferably at least 150 mole % based on the moles of dicarboxylic acid and polyoxyalkylene diimide diacid combined. Such molar excess of diol will generally allow for optimal yields, based on the amount of acids, while accounting for the loss of diol during esterification In this two-pot process the amount of the polyoxyalkylene diimide diacid and dicarboxylic acid utilized is critical in providing polyetherimide esters exhibiting high flexural modulus, and also improved solvent resistance. The amount of the polyoxyalkylene diimide diacid used is such that the weight ratio of the polyoxyalkylene diimide diacid to the dicarboxylic acid is from about 0.002 to 0.20:1, preferably from about 0.005 to about 0.15:1, and more preferably from about 0.005 to about 0.10:1. Within this ratio the polymers exhibit high flexural modulus and also improved organic solvent reistance, i.e., they exhibit improved stiffness. If the weight ratio maximum of 0.20 is exceeded the flexular modulus of the polymers is adversely affected, i.e., it is lowered. Also the solvent resistance of these polymers is adversely affected.

It is also possible, as described in U.S. Pat. No. 4,556,688, to prepolymerize the aromatic dicarboxylic acid and the diol to form a prepolyester, and then react this prepolyester with either the diimide diacid or with the tricarboxylic acid and the poly(oxy alkylene)diamine. Forming the prepolyester can be achieved by conventional esterification techniques such as those described in U.S. Pat. Nos. 2,465,319 and 2,910,466, all of which are incorporated herein by reference.

In its preferred embodiment, the composition of the instant invention will comprise the reaction products of dimethylterephthalate, optionally with up to 40 mole percent of another dicarboxylic acid; butane diol, optionally with another diol such as butene diol, hexanediol, or cyclohexane dimethanol; and either a poly(oxy alkylene)diamine having an average molecular weight of from about 600 to about 12,000, preferably from about 900 to about 4,000, and trimellitic anhydrid, or a polyoxyalkylene diimide diacid; wherein the weight ratio of the polyoxyalkylene diimide diacid to the dicarboxylic acid is from about 0.002 to 0.20:1, preferably from about 0.005 to about 0.15:1. and more preferably from about 0.005 to about 0.10:1. In its more preferred embodiments the diol will be butanediol and the dicarboxylic acid will be 100 mole percent dimethylterephthalate, with the weight ratio of the polyoxyalkylene diimide diacid to dicarboxylic acid being from about 0.002 to 0.20:1, preferably from about 0.005 to about 0.15:1, and more preferably from about 0.005 to about 0.10:1.

In the process of the present invention, particularly where all of the reactants are charged to the reactor together or where the polyoxyalkylene diimide diacid is preformed and excess tricarboxylic acid is present, a minor amount of the tricarboxylic acid or anhydride may react with available hydroxyl groups and ultimately function as a branching agent in the finished polymer. Within limits, the degree of branching in the finished polymer can be controlled by varying the mole ratio of tricarboxylic acid to poly(oxy alkylene)diamine. An excess of diamine reduces the degree of branching, while an excess of the tricarboxylic acid increases branching. In addition to controlling branching by varying the tricarboxylic acid/diamine mole ratio, one can compensate for branching by introducing a monofunctional reactant such as benzoic acid in minor amounts.

With reference to branching, it should be noted that polymers of this invention, when prepared from preformed diimide diacid, are substantially free of branching. If branching is desired, one needs only to introduce a branching agent, such as trimellitic anhydride, along with the preformed diimide diacid. The amount of branching agent generally will be less than 0.15 moles per mole of diimide diacid. Useful branching agents other than trimellitic anhydride include trimethyl trimellitate, glycerol, trimethylol propane, trimesic acid and its esters and the like.

The instant polyetherimide esters may be prepared by conventional esterification/condensation reactions for the production of polyesters. These processes are described, inter alia, in U.S. Pat. Nos. 3,763,109; 3,651,014 and 3,801,547, all of which are incorporated herein by reference, and in U.S. Pat. Nos. 4,556,705 and 4,556,688, also incorporated herein by reference.

The polyetherimide esters of the instant invention contain at least the following two recurring structural units:

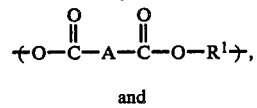

and

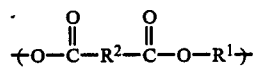

wherein:

A is the residue of the polyoxyalkylene diimide diacid absent the two carboxyl groups, i.e.,

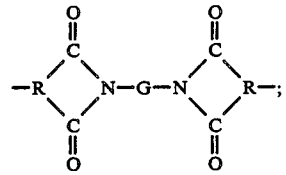

$R^1$ is the residue of the diol absent the two hydroxy groups; and $R^2$ is the residue of the dicarboxylic acid absent the two carboxyl groups.

The amounts of the recurring structural units of Formulae IV and V present are generally such that the ratio, by weight, of recurring structural units of Formula IV to recurring structural units of Formula V is from about 0.002 to 0.20:1, preferably from about 0.005 to about 0.15:1, and more preferably from about 0.005 to about 0.10:1.

Additionally, while not required, it is customary and preferred to utilize a catalyst or catalyst system in the process for the production of the polyetherimide esters of the present invention. In general, any of the known ester-interchange and polycondensation catalysts may be used. Although two separate catalysts or catalyst systems may be used, one for ester interchange and one for polycondensation, it is preferred, where appropriate, to use one catalyst or catalyst system for both. In those instances where two separate catalysts are used, it is preferred and advantageous to render the ester-interchange catalyst ineffective following the completion of the precondensation reaction by means of the known catalyst inhibitors or quenchers, in particular, the phosphorus compounds such as phosphoric acid, phosphenic acid, phosphonic acid and the alkyl or aryl esters or salts thereof, in order to increase the thermal stability of the resultant polymer.

Exemplary of suitable known catalysts there may be given the acetates, carboxylates, hydroxides, oxides, alcoholates or organic complex compounds of zinc, manganese, antimony, cobalt, lead, calcium and the alkali metals insofar as these compounds are soluble in the reaction mixture. Specific examples include zinc acetate, calcium acetate and combinations thereof with antimony tri-oxide and the like. These catalysts as well as additional useful catalysts are described in U.S. Pat. Nos. 2,465,319; 2,534,028; 2,850,483; 2,892,815; 2,937,160; 2,998,412; 3,047,539; 3,110,693 and 3,385,830, among others, incorporated herein by reference.

Where the reactants and reactions allow, it is preferred to use the titanium catalysts including the inorganic and organic titanium containing catalysts, such as those described, for example, in U.S. Pat. Nos. 2,720,502; 2,727,881; 2,729,619; 2,822,348; 2,906,737; 3,047,515; 3,056,817; 3,056,818 and 3,075,952, incorporated herein by reference. Especially preferred are the organic titanates such as tetra-butyl titanate, tetra-isopropyl titanate and tetra-octyl titanate and the complex titanates derived from alkali or alkaline earth metal alkoxides and titanate esters, most preferably the organic titanates. These too may be used alone or in combination with other catalysts such as, for example, zinc acetate, calcium acetate, manganese acetate or antimony trioxide, and/or with a catalyst quencher as described above. The catalyst is used in catalytic amounts, e.g., from about 0.005 to about 2 percent by weight based on total reactants.

Both batch and continuous methods can be used for any stage of the ether imide ester polymer preparation. Polycondensation of the polyester prepolymer with the polyoxyalkylene diimide diacid can also be accomplished in the solid phase by heating finely divided solid polyester prepolymer with the diimide diacid in a vacuum or in a stream of inert gas to remove liberated low molecular weight diol. This method has the advantage of reducing degradation because it must be used at temperatures below the softening point of the prepolymer.

Although the copolyetherimide esters of this invention possess good resistance toward heat aging and photodegradation, it is advisable to stabilize these compounds by the addition of an antioxidant.

Many of the oxidative and/or thermal stabilizers known in the art for copolyesters may be used in the practice of the present invention. These may be incorporated into the composition either during polymerization or while in a hot melt stage following polymerization. Satisfactory stabilizers include the phenols and their derivatives, amines and their derivatives, compounds containing both hydroxyl and amine groups, hydroxyazines, oximes, polymeric phenolic esters and salts of multivalent metals in which the metal is in its lower valence state. Some specific examples of these stabilizers are described in U.S. Pat. No. 4,556,688, incorporated herein by reference.

The instant polymers may be stabilized against ultraviolet radiation by the addition thereto of the well known ultraviolet radiation absorbers such as, for example, the benzophenones, benzotriazoles, and cyanoacrylates.

Further, the properties of these polymers can be modified by incorporation of various conventional and well known fillers such as carbon black, silica gel, alumina, clays, and chopped fiberglass or glass particles. These may be incorporated in amounts of up to about 50 weight percent, preferably up to about 30 weight percent.

The polymers of the instant invention may also optionally contain the various well known flame retardant compounds such as, for example, the halogen and/or sulfur containing organic and inorganic compounds and the alkali and alkaline earth metal salts of organic sulfonic acids.

DESCRIPTION OF THE PREFERRED EMBODIMENT

The following examples are presented to more fully and clearly illustrate the present invention. They are presented as illustrative of the present invention and are not to be considered as limiting the invention thereto. In the examples all parts and percentages are parts and percentages by weight unless otherwise specified.

The following example illustrates a polyetherimide ester polymer falling outside the scope of the instant invention. It is presented for comparative purposes only.

EXAMPLE 1

This example illustrates a polyetherimide ester having a polyoxyalkylene diimide diacid to dicarboxylic acid weight ratio of 0.34:1.0.

Into a reactor vessel are placed 12.6 parts by weight of butanediol, 6.5 parts by weight of a polyoxyalkylene diimide diacid (prepared by the imidization of trimellitic anhydride with JEFFAMINE D2000, a propylene ether diamine having an average molecular weight of 2,000, available from the Texaco Chemical Company), 16.2 parts by weight of dimethyl terephthalate, and a titanium catalyst and a phenolic antioxidant. The mixture is heated to about 180° C. whereupon methanol is generated. After the theoretical amount of methanol is removed the pot temperature is increased to about 250° C. and a vacuum is applied to produce the polyetherimide ester.

The flexural modulus and the flexural strength of this polymer are determined in accordance with ASTM D 790, and the results are set forth in Table I.

The following examples illustrate the polymers of the instant invention.

EXAMPLE 2

This example illustrates a polyetherimide ester having a polyoxyalkylene diimide diacid to dicarboxylic acid weight ratio of 0.0084:1.

Into a reactor vessel are placed 300 parts by weight of butanediol, 3.8 parts by weight of a polyoxyalkylene diimide diacid (prepared by the imidization of trimellitic anhydride with JEFFAMINE D2000), 388 parts by weight of dimethyl terephthalate, a phenolic antioxidant, and a titanium catalyst. The mixture is heated to about 180° C., whereupon methanol is generated. After the theoretical amount of methanol is removed, the pot temperature is increased to about 250° C. and a vacuum applied to produce the polyetherimide ester.

The flexural modulus and flexural strength of this polymer are determined as described in Example 1, and the results are set forth in Table I.

EXAMPLE 3

This example illustrates a polyetherimide ester having a polyoxyalkylene diimide diacid to dicarboxylic acid weight ratio of 0.037:1.

Into a reactor vessel are placed 300 parts by weight of butanediol, 17 parts by weight of polyoxyalkylene diimide diacid (prepared by the imidization of trimellitic anhydride with JEFFAMINE D2000), 388 parts by weight of dimethyl terephthalate, a phenolic antioxidant, and a titanium catalyst. The mixture is heated to about 180° C. whereupon methanol is generated. After the theoretical amount of methanol is removed, the pot temperature is increased to about 250° C. and vacuum applied to produce the polyetherimide ester.

The flexural modulus and flexural strength of this polymer are determined as described in Example 1, and the results are set forth in Table I.

EXAMPLE 4

This example illustrates a polyetherimide ester having a polyoxyalkylene diimide diacid to dicarboxylic acid weight ratio of 0.084:1.

Into a reactor vessel are charged 300 parts by weight of butanediol, 38 parts by weight of polyoxyalkylene diimide diacid (prepared by the imidization of trimellitic anhydride with JEFFAMINE D2000), 388 parts by weight of dimethyl terephthalate, a phenolic antioxidant, and a titanium catalyst. The mixture is heated to about 180° C. whereupon methanol is generated. After the theoretical amount of methanol is removed, the pot temperature is increased to about 250° C. and a vacuum applied to produce the polyetherimide ester.

The flexural modulus and flexural strength of the polymer are determined as described in Example 1, and the results are set forth in Table I.

TABLE I

| Example No. | Weight Ratio | Flexural Modulus (psi) | Flexural Strength (psi) |
|---|---|---|---|
| 1 | 0.34:1 | 63,000 | 3,600 |
| 2 | 0.0084:1 | 340,000 | 12,700 |
| 3 | 0.037:1 | 300,000 | 11,000 |
| 4 | 0.084:1 | 200,000 | 7,900 |

As illustrated by the data in Table I the polymers of the instant invention (Examples 2-4) exhibit a much higher flexural modulus and a much higher flexural strength than conventional polyetherimide ester polymer (Example 1).

In a preferred embodiment of the instant invention the polymers of the instant invention are free of a dimer acid of a high molecular weight, either as a reactant used in forming the instant polymers or as an additive to the polymer itself.

The polymers of the instant invention are useful in the production of extruded and injection molded parts.

Obviously, other modifications of the described embodiments will suggest themselves to those skilled in the art in light of the above detailed description. It is to be understood that all such modifications are within full intended scope of the instant invention as defined by the appended claims.

What is claimed is:

1. A polyetherimide ester polymer exhibiting a high flexural modulus comprising the reaction products of:
   (i) at least one diol;
   (ii) at least one dicarboxylic acid or an ester forming reactive derivative thereof; and
   (iii) a set of reactants selected from
      (a) (1) at least one high molecular weight poly(oxy alkylene)diamine, and (2) at least one tricarboxylic acid or a derivative thereof, or
      (b) at least one high molecular weight polyoxyalkylene diimide diacid;
   wherein the weight ratio of (iii) to (ii) is from about 0.002 to 0.20:1.

2. The polymer of claim 1 wherein said weight ratio of (iii) to (ii) is from about 0.005 to about 0.15:1.

3. The polymer of claim 2 wherein said weight ratio of (iii) to (ii) is from about 0.005 to about 0.10:1.

4. The polymer of claim 1 wherein said diol (i) is a low molecular weight diol selected from $C_2$ to $C_{15}$ aliphatic or cycloaliphatic diols.

5. The polymer of claim 4 wherein at least about 60 mole percent of said diols are the same.

6. The polymer of claim 4 wherein at least about 80 mole percent of said diols are the same.

7. The polymer of claim 6 wherein the predominate diol is 1,4-butanediol.

8. The polymer of claim 1 wherein said diol is 1,4-butanediol.

9. The polymer of claim 1 wherein said diol is butenediol.

10. The polymer of claim 1 wherein said diol is comprised of a mixture of 1,4-butanediol and at least one diol selected from butenediol, hexanediol, and cyclohexane dimethanol.

11. The polymer of claim 1 wherein said dicarboxylic acid is selected from $C_2$–$C_{19}$ aliphatic, cycloaliphatic, or aromatic dicarboxylic acids.

12. The polymer of claim 11 wherein said dicarboxylic acid is selected from aromatic dicarboxylic acids.

13. The polymer of claim 12 wherein said aromatic dicarboxylic acid is dimethylterephthalate.

14. The polymer of claim 1 wherein (iii) is (a).

15. The polymer of claim 14 wherein said high molecular weight poly(oxy alkylene)diamine (iii) (a)(1) is represented by the formula

wherein G is radical remaining after the removal of the amino groups of a long chain alkylene ether diamine, and said poly(oxy alkylene)diamine has an average molecular weight of from about 600 to about 12,000.

16. The polymer of claim 15 wherein said poly(oxy alkylene)diamine has an average molecular weight of from about 900 to about 4,000.

17. The polymer of claim 16 wherein said poly(oxy alkylene)diamine is selected from poly (ethylene ether)-diamine, poly(propylene ether)diamine, poly(tetramethylene ether)diamine, or mixtures thereof.

18. The polymer of claim 14 wherein said tricarboxylic acid (iii)(a)(2) is represented by the formula

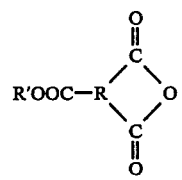

wherein R is a $C_2$ to $C_{20}$ trivalent aliphatic, cycloaliphatic or aromatic radical, and R' is hydrogen or a $C_1$–$C_6$ aliphatic radical.

19. The polymer of claim 18 wherein said tricarboxylic acid is trimellitic anhydride.

20. The polymer of claim 1 wherein (iii) is (b).

21. The polymer of claim 20 wherein said high molecular weight polyoxyalkylene diimide diacid is represented by the formula

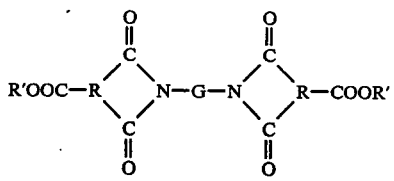

wherein:

each R is independently selected from $C_1$–$C_{20}$ aliphatic or cycloaliphatic trivalent organic radicals or $C_6$–$C_{20}$ aromatic trivalent organic radicals;

each R' is independently selected from hydrogen, $C_1$–$C_6$ aliphatic or cycloaliphatic monovalent organic radicals, or $C_6$–$C_{12}$ aromatic monovalent organic radicals; and G is the radical remaining after the removal of the amino groups of a long chain alkylene ether diamine having an average molecular weight of from about 600 to about 12,000.

22. The polymer of claim 21 wherein each R is a C6 trivalent aromatic hydrocarbon radical, each R' is hydrogen, and G is the radical remaining after the removal of the amino groups of a long chain alkylene ether diamine having an average molecular weight of from about 900 to about 4,000.

23. A polyetherimide ester polymer exhibiting improved flexural modulus comprised of at least the following two recurring structural units

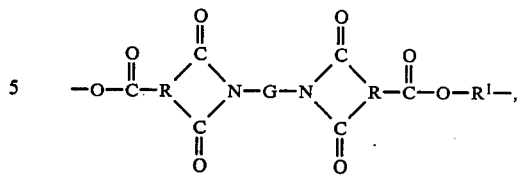

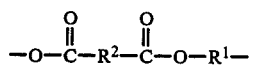

wherein $R^1$ is the residue of a diol absent the hydroxy groups, $R^2$ is the residue of a dicarboxylic acid absent the two carboxyl groups, R is a trivalent organic radical, and G is the radical remaining after the removal of the amino groups of a long chain poly (oxy alkylene)-diamine having an average molecular weight of from about 600 to about 12,000, and wherein the weight ratio of I to II is from about 0.002 to 0.20:1.

24. The polymer of claim 23 wherein said weight ratio of I to II is from about 0.005 to about 0.15:1.

25. The polymer of claim 24 wherein said weight ratio of I to II is from about 0.005 to about 0.10:1.

26. The polymer of claim 23 wherein G is the radical remianing after the removal of the amino groups of a long chain poly(oxy alkylene)diamine having an average molecular weight of from about 900 to about 4,000.

27. The polymer of claim 23 wherein $R^1$ is the residue of a low molecular weight aliphatic diol.

28. The polymer of claim 27 wherein said aliphatic diol is selected from butanediol, butenediol, hexanediol, cyclohexane dimethanol, or mixtures thereof.

29. The polymer of claim 23 wherein $R^2$ is the residue of an aromatic dicarboxylic acid.

30. The polymer of claim 29 wherein $R^2$ is the residue of dimethyl terephthalate.

31. The polymer of claim 23 wherein R is independently selected from $C_2$–$C_{20}$ aliphatic or cycloaliphatic trivalent organic radicals or $C_6$–$C_{20}$ aromatic trivalent organic radicals.

32. The polymer of claim 31 wherein R is a C6 aromatic trivalent hydrocarbon radical.

* * * * *